April 30, 1957     J. S. PARKER     2,790,205
VENTING BLADDER

Filed March 2, 1954     3 Sheets-Sheet 1

INVENTOR.
JOHN S. PARKER

*P. L. Miller*
ATTORNEY

April 30, 1957    J. S. PARKER    2,790,205
VENTING BLADDER

Filed March 2, 1954    3 Sheets-Sheet 2

INVENTOR.
JOHN S. PARKER
BY
R. L. Miller
ATTORNEY

April 30, 1957　　　　J. S. PARKER　　　　2,790,205
VENTING BLADDER

Filed March 2, 1954　　　　　　　　　　3 Sheets-Sheet 3

INVENTOR.
JOHN S. PARKER

BY
R. L. Miller
ATTORNEY

United States Patent Office 2,790,205
Patented Apr. 30, 1957

2,790,205

VENTING BLADDER

John S. Parker, Cuyahoga Falls, Ohio, assignor to The Goodyear Tire & Rubber Company, Akron, Ohio, a corporation of Ohio Application March 2, 1954, Serial No. 413,543

4 Claims. (Cl. 18—45)

This invention relates to a curing bladder or diaphragm and more specifically to a bladder of substantially cylindrical shape mounted between two relatively movable rings in a tire vulcanizing press for shaping and curing a substantially flat uncured tire band by placing the band over the bladder and expanding the bladder as the press is closed.

It is well known that in any tire vulcanizer air must be vented between the carcass of the tire and the curing diaphragm in order to avoid blistering or ply separation caused by trapped air forced through the fabric of the tire carcass under the urge of internal curing pressure of the diaphragm. Many expedients have been practiced in an attempt to overcome this problem. A common expedient is to punch small holes through the rubber sidewalls and treads before vulcanization to let the gases escape. However, this is impractical for tubeless tires which require an air-impervious carcass. Conventional curing bags have been grooved and provided with small ribs to allow entrapped air to escape and these expediencies have been successful but not for diaphragms or bladders of a character described above which are greatly expanded so that the portion of the bladder near the center plane of the tire is greatly stretched circumferentially. If radial ribs or grooves are provided on a bladder, the extreme circumferential stretching during expansion causes the ribs or grooves to flatten out so that the venting passages are blocked. On the other hand, if the ribs or grooves are made extremely large in cross section then not only does the bladder tend to fatigue at a faster rate but the cords of the tire being cured are deflected from their normal path.

An object of this invention is to provide a bladder of the character described with means to prevent air from being trapped between the bladder and the tire being cured without reducing the expectant life of the bladder.

Another object is to provide a bladder of the character described with venting means which will be subject to a minimum amount of transverse stretch.

Other objects and advantages of this invention will be readily understood from the description of a preferred form of the invention illustrated by the accompanying drawings, in which.

Figure 1:
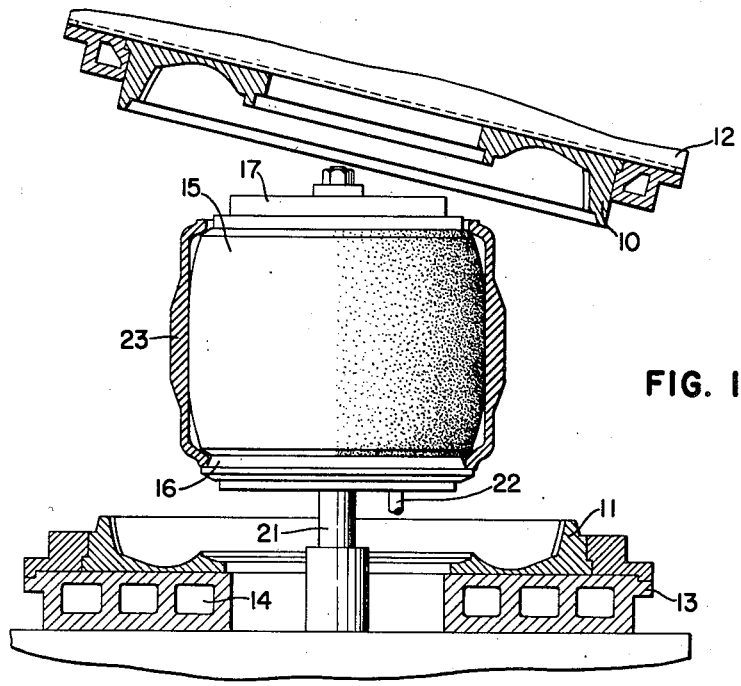
Fig. 1 is a side elevational view of the curing apparatus and bladder to which this invention pertains.

Referring to the drawings, reference numerals 10 and 11 indicate upper and lower mold halves secured to upper and lower press platens 12 and 13. The press structure including the platens and the mechanism for operating them may take any conventional or other suitable form (not shown) for moving the platens and mold halves from the position of Fig. 1 into the position of Fig. 3. The platens 12 and 13 are provided with means for heating the mold halves such as a system of steam chambers indicated by the numeral 14.

The expandable bladder member or diaphragm, indicated generally by the numeral 15, comprises a flexible, radially expandable cylindrical or tubular member formed of a flexible elastic material. The edges of the bladder are clamped between circular heads 16 and 17 forming a closed chamber 18. The lower head 16 is supported on a cylindrical sleeve 19 sliding in a cylindrical guide member 20 secured to the lower press platen 13. The upper head 17 is secured to a rod 21 which passes through sleeve 19 and lower head 16. The lower head 16 is provided with suitable pipe connections 22 by which fluid pressure, either gaseous or liquid, may be supplied to and preferably circulated through the chamber 18.

In Fig. 1 the parts are shown in their positions at the start of the curing operation. As there shown the vulcanizing press is open, the heads 16 and 17 are at their points of maximum separation, thus holding the member 15 in substantially cylindrical form. When the press is opened the pressure is relieved or evacuated from chamber 18. With the parts in this condition a raw tire carcass 23, still in the flat or semi-flat form in which it was built, is placed over the member 15.

Figure 2:
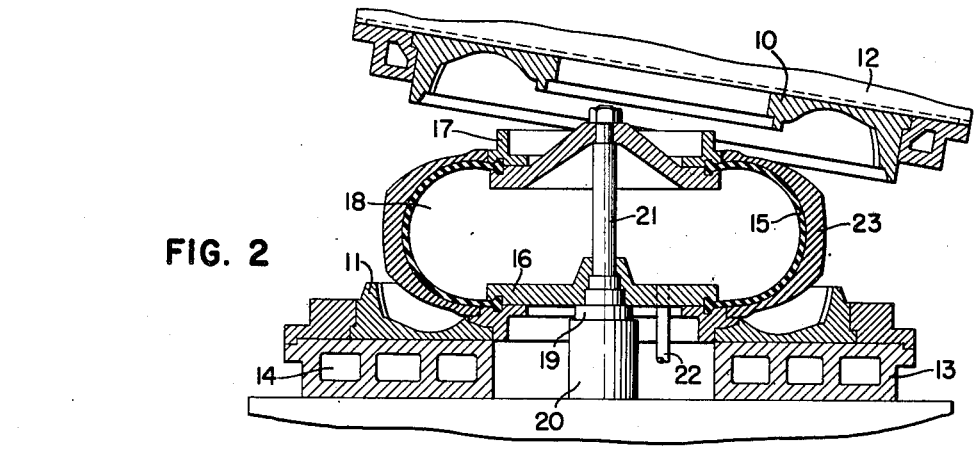
Fig. 2 is a side elevational view similar to Fig. 1 showing the curing load in partially closed position.
Figure 3:
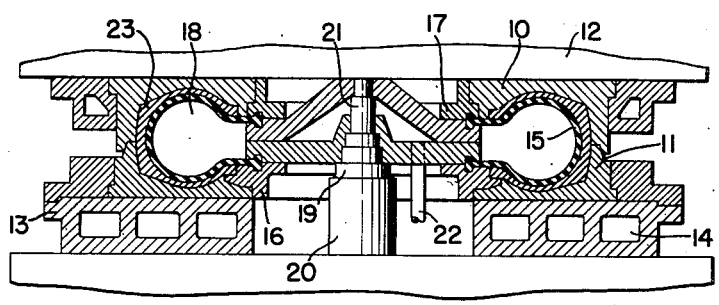
Fig. 3 is a side elevational view showing the curing molds in closed position.

The actuating mechanisms, not shown are then started so as to lower the heads 16 and 17. Rod 21 continues to be drawn downwardly thus decreasing the distance between the heads and expanding the member 15 outwardly as shown in Fig. 2. At the same time the press platens are moving toward their closed position shown in Fig. 3. Simultaneously, fluid pressure is admitted to the chamber 18 to assist in the shaping of the tire. After the heads 16 and 17 are brought together, as shown in Fig. 3, full pressure is admitted to the chamber 18 and maintained during the vulcanizing period. It will be evident that the pressure bladder 15 has served both to shape the casing and force the casing against the mold during cure and that the cured tire is removed from the mold in an unbagged condition.

As the bladder 15 is expanded from the position shown in Fig. 1 to the position shown in Fig. 3, the area adjacent the center line 24 of the bladder is stretched to a considerably greater extent than the end portion 25. Also, the bladder is stretched to a greater extent circumferentially than radially, as shown by curve I in Fig. 9 which is a plot of the ratios of circumferential to radial stretch axially across one half of an unstretched bladder having typical dimensions. Near the center line 24 of the bladder the circumferential stretch is approximately twice the radial stretch and the ratio of circumferential to radial stretch decreases toward the end portion 25 to a value of one or less. If venting means are incorporated in the bladder in a substantially radially extending direction an increasingly greater stress will be applied transversely of the venting means as it approaches the center of the bladder than will be applied longitudinally of the venting means, since the circumferential stretch is greater than the radial stretch. Repeated inflations of a bladder grooved in this manner will rapidly cause cracking to form in the venting means and materially decrease the life of the bladder.

Applicant's invention consists of molding or cutting venting means 26 of minimum length in a bladder in a manner which permits a minimum amount of stretch to be applied transversely thereof.

Figure 4:
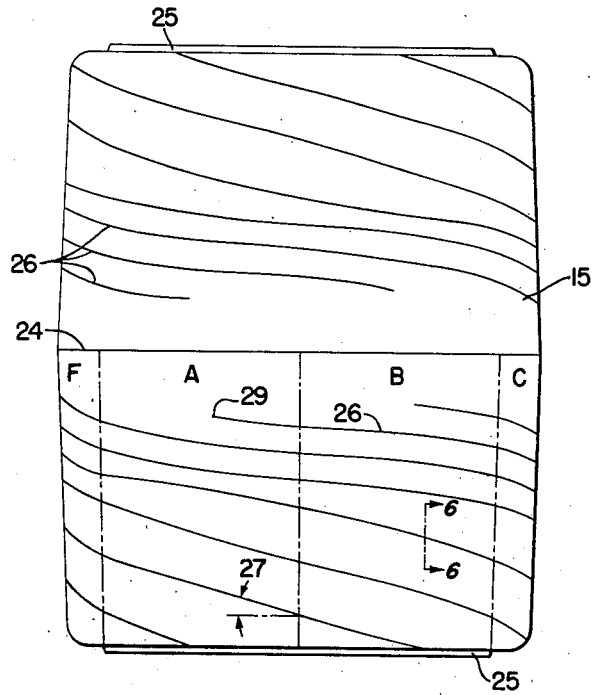
Fig. 4 is a longitudinal view of the uninflated bladder shown in Fig. 1.
Figure 6:
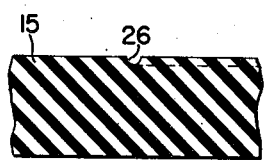
Fig. 6 is a cross-sectional view taken along the lines 6—6 of Fig. 4.
Figure 7:
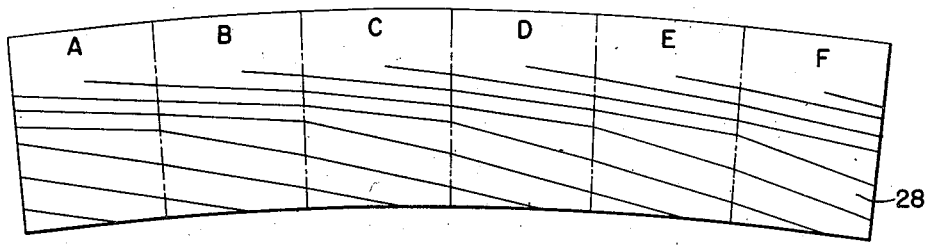
Fig. 7 is a plan view of a template showing the layout of the bladder and venting grooves shown in Fig. 4.
Figure 5:
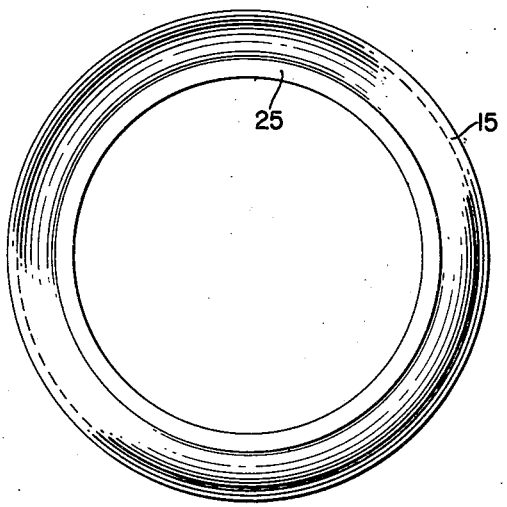
Fig. 5 is a side elevational view of the curing bladder shown in Fig. 4.
Figure 8:
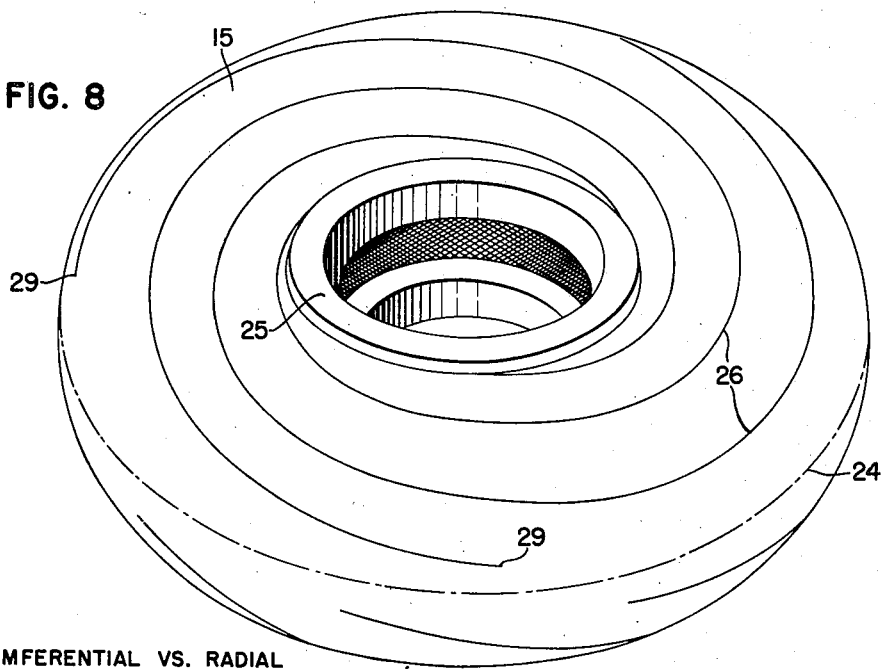
Fig. 8 is a perspective view of the bladder of this invention shown in inflated position.
Figure 9:
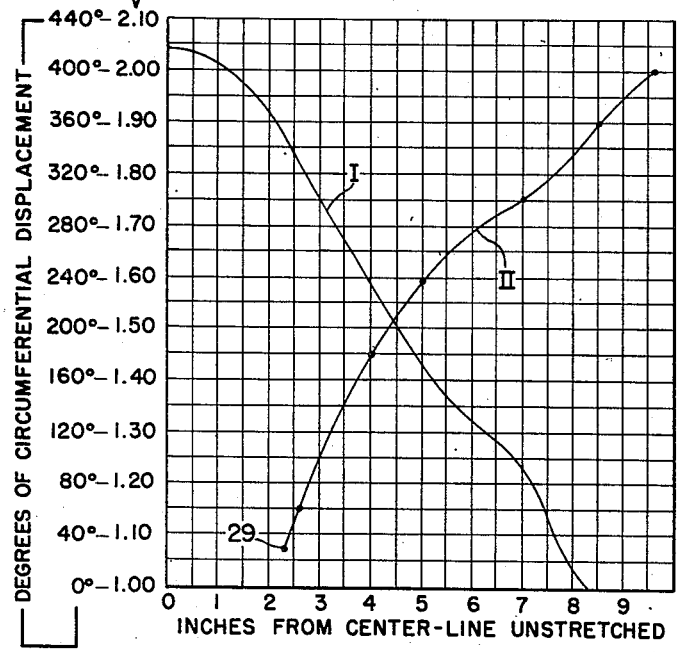
Fig. 9 is a graph showing the combined stretch ratio and circumferential displacement of the venting means of this invention relative to the distance from the center line of an unstretched bladder.

Although the preferred embodiment of the applicant's invention will be described and is illustrated by a venting means 26 in the cross-sectional form of a groove, it is to be understood that the invention is not limited to that specific cross-sectional form. The venting means may be in the cross-sectional form of a rib projecting from the surface of the bladder, knurling and other well-known cross-sectional forms. Applicant's venting means 26 extends in a helical or spiral direction around the bladder. Referring to Fig. 4 it is seen that each venting means or groove 26 begins at the end portion 25 and extends circumferentially at a very slight angle of inclination 27 to a plane at right angles to the longitudinal axis of the bladder. This angle of inclination 27 is decreased as the groove approaches the center portion 24 of the bladder so that the resultant transverse force of the increasing circumferential stretching is minimized. Curve II, shown in Fig. 9 shows the axial displacement of groove 26 from the center line 24 of a bladder of typical dimensions plotted against the degrees of circumferential displacement of the groove. Fig. 7 is a plan view of a template 28 showing the layout of the grooves 26 on a bladder divided into sectors A through F, each representing 60° of circumference of bladder 15. A groove 26 begins in each sector at a point 29 which is displaced from the center line 24 and from the left hand margin of each sector. Referring to curve II of Fig. 9, it is seen that the amount of axial displacement per degree of circumferential displacement increases from point 29. In the preferred embodiment of this invention the angle 27 of each increment of length of groove 26 increases toward end portion 25 in substantially inverse ratio to the amount of circumferential stretch at each increment of length. In this manner, the groove is transversely stretched a minimum amount while the length of the groove path is maintained at a minimum. The angle of inclination 27 of the venting groove is such that the transverse stretch on the groove resulting from the circumferential stretch is negligible. Obviously, if the ratio of the bladder diameter to the length of the bladder is increased, the venting means may not necessarily extend circumferentially over 360°.

If the angle of inclination 27 is increased, the venting groove 26 will traverse a distance from end portion 25 to the center portion 24 at a faster rate so that the length of the groove will be shorter but the amount of transverse stretch applied thereto will be increased. It has been found that for optimum results the angle of inclination should be maintained below approximately 15°.

Although applicant's invention contemplates increasing or varying the angle of inclination 27 of the helical extending venting means as the vent approaches the end portion 25 in inverse ratio to the amount of stretch at each increment, it is not at all necessary nor practical that the angle 27 of the vent be increased in a strict inverse ratio since this might cause unnecessary difficulty in forming the ribs or grooves. Accordingly, as shown in Fig. 7, the angle of inclination of the vent means beginning in sector A of the bladder is maintained substantially constant through sectors A through D and thereafter increased through sectors E and F whereby the transverse stretch at any point along the path of the groove never exceeds the amount at the point 29 of the path nearest the center line of the bladder.

While certain representative embodiments and details have been shown for the purpose of illustrating the invention, it will be apparent to those skilled in this art that various changes and modifications may be made therein without departing from the spirit or scope of the invention.

I claim:

1. A flexible bladder of generally cylindrical shape expandable into a toroidal form for shaping and curing a tire band within a mold, said bladder having venting means in the surface thereof extending in a generally helical direction from each end of the bladder toward the center thereof, said venting means extending at a low angle of inclination to maintain a negligible amount of stretch transversely of said venting means when the bladder is expanded into toroidal form, the angles of inclination of said helically extending venting means decreasing as the venting means approaches the center of the bladder.

2. A flexible bladder of generally cylindrical shape expandable into toroidal form for shaping and curing a tire band within a mold, said bladder having venting means in the surface thereof extending in a generally spiral direction from each end of the bladder toward the center thereof, the angle of inclination of said venting means being greater at the end of the bladder than at the center thereof, said venting means extending at a low angle of inclination to maintain a negligible amount of stretch transversely of said venting means when the bladder is expanded into toroidal form.

3. A flexible bladder as claimed in claim 2 in which the angles of inclination of each increment of said spirally extending venting means decrease from the ends of the bladder toward the center thereof in substantially inverse ratio to the ratio of circumferential to radial stretch at each increment.

4. A flexible bladder of generally cylindrical shape expandable into toroidal form for shaping and curing a tire band within a mold, said bladder having venting means extending in a generally helical direction from the ends of the bladder toward the center thereof, the angle of inclination of each increment of the helical venting means being less than 15° and decreasing toward the center of the bladder in substantially inverse ratio to the amount of circumferential stretch at said increment.

References Cited in the file of this patent

UNITED STATES PATENTS

| | | |
|---|---|---|
| 1,635,243 | Abbott | July 12, 1927 |
| 2,243,532 | Maynard | May 27, 1941 |
| 2,678,468 | Smith | May 18, 1945 |